United States Patent [19]
Audsley et al.

[11] Patent Number: 5,152,714
[45] Date of Patent: Oct. 6, 1992

[54] TREATMENT OF POULTRY: ANOXIC POULTRY STUNNING

[75] Inventors: Antony R. S. Audsley, Cheddar; Neville G. Gregory; Ambur B. M. Raj, both of Bristol, all of England

[73] Assignee: The BOC Group plc, Windlesham, United Kingdom

[21] Appl. No.: 633,551

[22] Filed: Dec. 21, 1990

[30] Foreign Application Priority Data

Dec. 21, 1989 [GB] United Kingdom ................ 8928935

[51] Int. Cl.$^5$ ................................. A22B 3/00
[52] U.S. Cl. ......................................... 452/66
[58] Field of Search ..................... 452/66, 67, 54, 57

[56] References Cited

U.S. PATENT DOCUMENTS 3,230,577  1/1988  Hughes .

FOREIGN PATENT DOCUMENTS 898816    5/1984   Belgium .
3715211   1/1988   Fed. Rep. of Germany .
384495    9/1973   U.S.S.R. ................................. 452/66
8807328  10/1988   World Int. Prop. O. .

OTHER PUBLICATIONS

"Carbon Dioxide Immobilization of Turkeys Before Slaughter"; Circular No. 958; U.S. Dept. of Agriculture; Feb. 1955.
"Effect of Stunning Current on Carcase Quality Defects in Chickens", Gregory, The Vet. Record, May 20, 1989, pp. 530-533.
"Early Post-Mortem Chemical and Tenderness Changes in Poultry", De Femery & Lineweaver.
"Effects of Electrical Stunning on Post-Mortem Biochem. Changes and Tenderness in Broiler Breast Muscle", Lee et al., J. of Food and Sci., vol. 44, 1979, pp. 112-128.
"The Current Roles of Inert Gases in the Search for Anaesthesia Mechanisms", Pharmacological Reviews, Mar. 1963.
"Carbon Dioxide Stunning of Broilers", I. Bogdonov et al., Meat Technology Research Institute, Sofia, Bulgaria.
"Effect of Stunning Poultry with Carbon Dioxide on the Looseness of the Feathers", V. Svetlov, Mayasnay Industriya SSSR, 1969, vol. 40 (11), pp. 39-40.
"Humane Slaughter and Euthanasia", Laboratory Science and Technology, Nov. 1986.
"Experimentation with In-line Carbon Dioxide Immobilization of Chickens Prior to Slaughter", Kotula, Poultry Sci., XL, Jan. 1961.
"Effect of Carbon Dioxide Immobilization on the Bleeding of Chickens", Kotula, Poultry Sci., XXXVI #3., May 1957, pp. 585-589.
"Effect of Electrical Stunning on Somatosensory Evoked Potential in Chickens", Gregory, Bri. Vet. J., 1989, pp. 145-159.
"Effect of Slaughter on the Spontaneous and Evoked Activity of the Brain", Gregory, British Poultry Sci., vol. 27 (1986) pp. 195-205.

Primary Examiner—Willis Little
Attorney, Agent, or Firm—David M. Rosenblum; Larry R. Cassett

[57] ABSTRACT

Prior to slaughter, poultry are caused to undergo anoxic convulsions by exposure to an atmosphere for a sufficient period of time to lose consciousness. The poultry are then slaughtered. After slaughter, the poultry are chilled and then deboned or portioned. It is found that deboning or portioning can be performed within four hours of slaughter, instead of the conventional period of twelve hours or more, without adversely affecting the quality of the resultant meat. This result is attributed to the anoxic convulsions causing glycolysis in the pectoral and other muscles of the birds.

11 Claims, No Drawings

TREATMENT OF POULTRY: ANOXIC POULTRY STUNNING

TECHNICAL FIELD

The present invention relates to a method for the treatment of poultry prior to slaughter so as to produce carcasses with improved properties.

BACKGROUND OF THE PRIOR ART

Poultry are conventionally slaughtered by first electrically stunning each bird in turn and then killing the stunned birds by cutting their necks. The purpose of stunning is to ensure that the birds feel no pain when they are killed. The electrical stunning procedure involves removing birds from a transport crate, individually shackling them by their legs, conveying each shackled bird to an electric stunning bath in which the head of the bird is immersed in water which acts as the live electrode and current passes through the bird to earth via the shackle. The electrical stunning itself causes electroplectic convulsions, which result in haemorrhaging in the muscles of the breast and legs, and broken bones in the carcasses, particularly in the collar region. These conditions can lead to downgrading of poultry carcasses. Moreover, under the present commercial practice, the electrically stunned birds are processed mechanically and stored overnight typically up to 18 hours in a chiller, before the carcasses are either portioned or deboned for the retail market. If deboning is performed earlier, for example on the day of slaughter, then the muscles contract resulting in tougher meat. It is believed in the art that to avoid the problem of muscle contraction, post mortem glycolysis in the carcasses needs to be substantially completed before the steps of deboning and forming portions ('portioning') can be performed without there being a resulting toughening of the meat upon cooking.

SUMMARY OF THE INVENTION

The present invention aims at providing a method of slaughtering poultry which provides a better opportunity for deboning or portioning a carcass at an earlier stage post mortem.

According to the present invention, there is provided a method of forming portions of poultry carcasses, comprising the steps of slaughtering poultry, and dividing the resulting carcasses into portions or deboning them, wherein immediately prior to slaughter the poultry are caused to undergo anoxic convulsions.

The poultry are preferably caused to undergo anoxic convulsions by being subjected to an atmosphere containing only a low concentration of oxygen, preferably less than 2% by volume and more preferably less than 1% by volume, for a sufficient period of time in which to lose consciousness. This period of time is preferably at least one minute. The atmosphere may consist essentially of nitrogen or argon (or other noble gas) or may be formed by mixing such gas on the one hand with carbon dioxide or a small amount of air on the other hand. The atmosphere is desirably of controlled composition. Preferably, the supply of nitrogen and/or argon from an external source to a chamber in which the atmosphere is formed is controlled in response to the monitored concentration of oxygen so as to maintain that concentration below a chosen maximum.

After losing consciousness the birds may be slaughtered by the conventional procedure which comprises cutting the neck of each bird. It is very much preferred to effect slaughter by subjecting them to the atmosphere for a sufficiently long period of time for the poultry to die. Typically the birds are subjected to the atmosphere for a period of at least two minutes for them first to lose consciousness and then to die. Immediately after slaughter by anoxia, the birds are desirably treated by having their necks cut and thereby being bled.

The poultry are preferably subjected to said atmosphere while packed in crates. These crates may be the ones used to transport them from farm to place of slaughter. Accordingly, there is no need for any worker in the place of slaughter to touch the poultry by hand prior to slaughter.

DETAILED DESCRIPTION OF THE INVENTION

The loss of consciousness of the poultry in the method according to the present invention is accompanied by anoxic convulsions which take the form of involuntary flapping of the wings. It is believed that such flapping of the wings causes glycolysis in the pectoral and other muscles of the birds with the result that within 20 minutes after death, the pH of the pectoralis major muscle was found to be substantially lower (typically below 6) than in conventionally (electrically) stunned and conventionally slaughtered birds. Moreover, whereas in the latter class of birds, the pH continues to fall substantially over the next 24 hours, the fall in the pH of birds slaughtered in accordance with the invention over the next 24 hours was much less marked.

It is normal practice for the poultry to be chilled to a temperature typically in the range of 1 to 10° C. after slaughter and bleeding (and initial plucking of the carcasses), and held at that temperature for a period of at least 12 hours. He believe that by adopting the method according to the invention the chilling period may be substantially reduced typically to a period of from 30 minutes to 4 hours while still producing meat of acceptable quality when cooked.

The stunning and slaughter of the birds may be performed in a chamber. The preliminary treatment of each carcass after slaughter, and the chilling and the deboning or portioning of each carcass are typically performed by conventional methods.

The chamber preferably has associated with it means for conveying the crates into and out of the chamber. In one example of the invention, the crates may be conveyed continuously through the chamber, and the extent of the chamber and the rate of passage of the crates may be so chosen that the birds are all dead by the time the crates exit the chamber. Alternatively, the crates may be held stationary in the chamber for a given period of time. This latter arrangement offers the advantage of making possible a chamber of smaller volume to be used, but may be less suitable for continuous slaughter of birds.

The chamber preferably has at least one fan which is operable to prevent stagnation of the atmosphere therein. Operation of the fan helps to reduce the tendency for local pockets of atmosphere relatively rich in oxygen to be maintained. It is also preferred that the crates have ample ventilation orifices. Such orifices are preferably provided in the base of each crate as well as in the top or sides thereof.

The method according to the invention will now be further described with reference to the following Examples:

EXAMPLE 1

Broilers were stunned in carbon dioxide-air atmospheres, argon-air atmospheres and by electric current, and the carcasses were plucked either by a mechanical plucker or by hand.

Carcass and meat quality were evaluated to determine the effect of these stunning treatments and plucking methods. The quality factors included the pH at 20 min post-mortem, ultimate pH, texture and colour of the pectoralis major muscle, and the incidences of carcass appearance defects, broken bones and bruises in the breast and leg muscles.

The stunning method was found to have a significant effect on pH 20 min, ultimate pH, texture and colour of breast meat, and plucking method had a significant effect on the cooking loss and texture.

Argon stunning resulted in less muscular haemorrhage and more rapid early post-mortem glycolysis but the breast meat was relatively more tender than in the electrically stunned broilers., carbon dioxide stunned broilers had intermediate values.

It is believed that the argon stunning of broilers produced relatively better quality carcasses and meat than the electrically stunned broilers.

Experimental Procedure

Two replicates of 120 Ross commercial broilers obtained from different sources were studied. Hithin each replicate, 40 broilers were subjected to each of the stunning methods, the gaseous stunning was performed in batches of ten broilers per crate whereas electrical stunning was done singly, but the electrically stunned broilers were numbered sequentially in batches of ten. In both replicates, one half of the boilers from each stunning method were hand plucked and the other half were mechanically plucked. From each batch of 10 broilers, 5 carcasses were eviscerated and the other 5 carcasses were left uneviscerated. All the carcasses were chilled overnight before assessing external carcass appearance defects. The eviscerated carcasses were used for pH, cooking loss and texture measurements whereas uneviscerated carcasses were used for the assessment of the incidence of broken bones, muscle bruising and meat colour.

Source of Broilers

In replicate one, 120 broilers at 7 weeks of age were obtained from a poultry processor transported to the testing location, rested for 2 days with libitum water and finisher diet, and fasted overnight prior to slaughter. In replicate two, Ross commercial broilers were grown from day old at the testing location on deep litter and fed recommended commercial diets. In this replicate, broilers were not fasted prior to slaughter. The age at slaughter was 54 days for replicate one and 59 days for replicate two.

Pre-slaughter Handling

Broilers in both the replicates were kept in the same house and prior to slaughter they were randomly caught, crated (10 broilers per crate of size $80 \times 50 \times 28$ cm) and transported (about 50 m) to the stunning plant in the case of gaseous stunning and to the processing plant (about 10 m) in the case of electrical stunning. To minimize the pre-slaughter handling stress, the broilers were not weighed prior to slaughter and care was taken during handling and transport.

Stunning and Slaughter

In the gaseous stunning treatments, the crates were loaded on to a lift which descended in 18 second ("s") into a well containing the stunning gas. The broilers were exposed to a $CO_2$-air atmosphere having a nominal concentration of 45% carbon dioxide and 9% oxygen by volume and to an argon-air atmosphere having a nominal argon concentration of 90.2% and a nominal oxygen contraction of 2% by volume. The carbon dioxide or oxygen concentration was recorded (Servomex gas analyser, Model 1275 for carbon dioxide and Model 1175 for oxygen; Servomex Ltd., Crowborough, Sussex) at every 30 s interval until the end of the stunning period 120 s from the time the lift reached the bottom of the well (Table 1). After gaseous stunning the broilers were uncrated and bled manually by unilateral neck cutting aimed at severing one carotid artery and one jugular vein. Electrical stunning was performed using a water bath stunner delivering a constant current of 107 mA (50 Hz in the form of sinusoidal wave form) for 4 s and allowed to bleed after a unilateral manual neck cut.

All the broilers were weighed after bleeding and then scalded at 51° C. for 2 min. One half of the broilers were plucked with an automated mechanical plucker (Cope and Cope, Reading) and the remainder were hand plucked. The pH was measured at 20 min post-mortem in the breast muscle (pectoralis major muscle) of eviscerated carcasses and all the carcasses were stored at 1° C. overnight and were then subjectively evaluated for carcass appearance defects according to Gregory and Hilkins, 'Effect of stunning current on carcass quality defects in chickens', Veterinary Record, 124, pp 530 to 532 (1989). Subsequently the eviscerated carcasses were used to measure the ultimate pH of breast muscle, cooking loss and texture.

The uneviscerated carcasses were dissected and examined for broken bones and muscle bruising as described by Gregory and Hilkins, and the pectoralis major muscle was separated for colour measurements. Among the carcasses with defects, the majority of them had a score of 1 for either carcass appearance defects or breast muscle bruising, thus, only the overall incidences have been reported.

pH Measurement

The pH of the pectoralis major muscle was recorded using a temperature compensated pH meter with a combination spear electrode (Russel pH Ltd., Fife, Scotland) at 20 min post-mortem and after 24 h (ultimate pH).

Determination of Cooking Loss

Eviscerated carcasses of known weight were placed in roasting bags and cooked in an electric fan oven at 190° C. Each carcass was cooked to a deep breast temperature of 90° C. The cooked carcasses were drained for 15 min at room temperature and weighed, the loss in weight was expressed as a proportion of the initial weight (g per kg).

Determination of Texture

The pectoralis major muscle was removed from the cooked and cooled roasted carcasses, and 8 blocks of muscle in which fibers were all parallel measuring 20×10×5 mm were prepared. The force required to compress 4.5×10 mm cross sectional area was recorded using a Volodkevitch flesh consistency attachment fitted to a Steven's Compression Response Analyser (B. Stevens & Son Ltd., St Albans, Herts.) using a 5 kg load cell and a probe speed of 20 mm/min. The values are expressed as kg yield force.

Colour Measurements

The pectoralis major muscles dissected from unviscerated carcasses were split longitudinally and the freshly cut surface was wrapped with a thin cling-film and allowed to bloom in a chiller. After an hour, the colour of the cut surface was measured using a portable Minolta Chromometer II Reflectance meter with an illuminant C light source. The primary colour co-ordinates $L^*$, $a^*$ and $b^*$ on CIE (Commission Internationale de l'Eclairage) LAB space were calculated. From the primary co-ordinates the chroma (Cab as a function of $a^*$ and $b^*$), hue angle (Hab as a function of $b^*/a^*$) and brightness (Eab as a function of $L^*$, $a^*$ and $b^*$) were derived according to CIE (1971).

Statistical Analysis

The meat and carcass quality parameters were subjected to a two-way analysis of variance to investigate the effect of stunning and plucking methods.

Results

The results of the meat quality assessment are presented in Table 2. Statistically significant differences between the stunning methods ($P<0.05$) were found for all the parameters except cooking loss, $b^*$ and hue angle. Plucking method had a significant effect on cooking loss and texture ($P<0.001$ and $P<0.05$, respectively). There were no statistically significant interactions between stunning and plucking methods.

The pectoralis major muscle of electrically stunned broilers had the highest mean pH at 20 min post-mortem, that with argon stunning the lowest., and that with carbon dioxide stunned broilers an intermediate mean pH value. The differences between the three means were statistically significant ($P<0.001$). At 24 hours post-mortem the pectoralis major muscle of broilers stunned by electrical stunning and argon had similar pH values, and were significantly higher than the pH of carbon dioxide stunned broilers ($P<0.01$). The drop in pH between 20 min and 24 hours post-mortem was significantly different between the stunning methods and all the three means differed significantly from each other ($P<0.001$).

Only plucking method had a statistically significant effect on the cooking loss ($P<0.001$). In all the stunning methods, the mechanically plucked broilers had a greater cooking loss when compared to hand plucked broilers. Both the stunning methods and plucking methods had significant effects on the texture of cooked pectoralis major muscle ($P<0.05$ and $P<0.01$, respectively). The breast meat from electrically stunned broilers was marginally tougher than the carbon dioxide stunned broilers which were in turn tougher than the argon stunned broilers.

The means for the stunning methods differed significantly from each other ($P<0.05$). Although the interaction between stunning and plucking was not statistically significant for the overall data, carbon dioxide and argon stunned mechanically plucked broilers were tougher than the hand plucked carcasses ($P<0.001$), whereas within electrical stunning, the plucking method did not have a significant effect on texture.

Among the primary colour co-ordinates derived on CIE LAB space for the pectoralis major muscle only $L^*$ and $a^*$ were different between the stunning methods ($P<0.05$ and $P<0.01$ respectively). The breast muscles from broilers stunned by electrical stunning and carbon dioxide had similar $L^*$ values which were significantly higher than the mean $L^*$ value of broilers stunned by argon ($P<0.001$). The mean $a^*$ values of the three stunning methods differed significantly from each other ($P<0.001$). The $a^*$ value was the highest for broilers stunned in argon, intermediate in electrically stunned broilers and lowest in carbon dioxide stunned broilers. The chroma (function of $a^*$ and $b$) and brightness (function of $L^*$, $a^*$ and $b^*$) were also statistically different between the stunning methods ($P<0.05$). The broilers stunned in argon had a significantly higher chroma and lower brightness than the electrically stunned and carbon dioxide stunned broilers ($P<0.01$).

The total incidence of carcass appearance defects was similar in all the three stunning methods (Table 3), but the mechanically plucked broilers suffered more appearance defects than the hand plucked. The incidence of broken bones was highest in electrical stunning, intermediate in carbon dioxide and lowest in argon stunning. In all the stunning methods the mechanically plucked broilers showed a greater incidence of broken bones than the hand plucked broilers. No breast muscle bruising was found in the carbon dioxide and argon stunned carcasses, whereas in electrical stunning, irrespective of plucking methods there was a higher incidence of breast muscle bruising, particularly in the deeper parts of the muscle (ventral surface of the muscles p. minor and p. major). Electrically stunned broilers had the highest incidence of bruising in the leg (9 carcasses in each of the plucking methods), both superficially and deep. Carbon dioxide stunned mechanically plucked (2 superficial and 1 deep) and argon stunned hand plucked (1 superficial) carcasses had considerably less leg bruising.

The pH at 20 min post-mortem reflected the amount of convulsions that were observed subjectively during stunning. The broilers stunned in argon showed noticeably more wing flapping and resulted in the lowest mean pH at 20 min post-mortem compared with carbon dioxide stunned broilers which flapped relatively less. When compared to electrically stunned broilers, it appears that the wing flapping in gaseous stunned broilers accelerated the early post-mortem glycolysis, but did not result in a PSE-like condition. The electroplectic fit which resulted from electrical stunning had very little effect on the pH at 20 min post-mortem.

The effects of stunning treatments on the ultimate pH of the pectoralis major muscle were small, although statistically significant, would not be expected to have an adverse effect on the keeping quality of the meat. The acceleration of glycolysis as a result of stunning in argon produced breast meat which had the lowest texture value (1.4 kg yield force). This is contrary to previous work in the art which suggested that the accelerated early post-mortem glycolysis resulted in tougher meat (see de Fremery and Lineweaver, 1962 'Early post-mortem chemical and tenderness changes in poultry's Proceedings of the First International Congress of Food Science and Technology, 1, pp 13 to 21; Lee et al., 1979'. 'Effect of electrical stunning on post-mortem biochemical changes and tenderness in broiler breast muscle' Journal of Food Science, 44. pp 1121, 1122, and 1128).

The number of carcasses with more than one appearance defect were found to be 14 in the electrically stunned group (17.5%), 4 in carbon dioxide (5%) and none in argon. There was no indication of carcass appearance defects relating to the convulsions in the gaseous stunning treatments. The incidence of broken bones in this study, do not appear to be related to the incidence of breast muscle bruising and broken bones seems to be an effect of mechanical plucking rather than the effect of stunning.

Wing flapping had no effect on the breast muscle bruising. A possible explanation would be that the wing flapping in broilers is an act very similar to that of flight and the breast muscles are morphologically designed to cope with it, irrespective of the severity over a short duration. On the contrary, the tonic muscular spasm induced by electrical stunning appears to be relatively more detrimental to meat quality.

A small proportion of broilers stunned in carbon dioxide (3 out of 20 mechanically plucked) and argon (1 out of 20 hand plucked) had leg muscle bruising, which could have been the effect of crating or due to convulsions. But the incidence of 9 out of 20 carcasses in each of mechanically and hand plucked broilers of electrical stunning suggests that either the shackling of live broilers or the electrical stunning itself was responsible for the occurrence of leg muscle bruising.

A closer examination of the data revealed that the electrically stunned broilers had 5 and 6 carcasses with breast and leg bruises respectively which were given a score of 2 (would have required trimming of a portion) and the majority Of these occurred in hand plucked broilers. The incidence of bruising with this severity was none in argon and only one in carbon dioxide. This suggests that the muscular damage that occurs in gaseous stunning is relatively low.

In conclusion it would seem that stunning of broilers in argon or carbon dioxide is not detrimental to carcass or meat quality. The substantially more rapid post-mortem glycolysis which arises from argon stunning/slaughter allows carcasses to be deboned after a relatively short chilling period, typically less than three hours. We attribute the relatively longer post-mortem glycolysis time exhibited by carbon dioxide stunning to the less marked convulsions during stunning in the carbon dioxide atmosphere. Accordingly, if desired carbon dioxide may be included as a component of an 'anoxic' stunning atmosphere for use in the method according to the invention provided that the oxygen content of the atmosphere is kept low (preferably below 2%j by volume). If desired, nitrogen may be substituted for the argon, or indeed a noble gas other than argon used instead of some or all of the argon.

TABLE 1

Broiler Stunning Conditions and Procedures

| Stunning method[1] | Stunning Gas conc. (%) or current (mA) mean | S.D. | duration (s) | Bleedout time (s) mean | S.D. | Carcass Weight after bleeding (kg) mean | S.D. |
|---|---|---|---|---|---|---|---|
| Carbon dioxide | 47 | 2 | 120 | 155 | 12 | 2.3 | 0.2 |
| Oxygen[2] | 2 | 0.3 | 120 | 147 | 19 | 2.2 | 0.2 |
| Electrical | 107 | 1 | 4 | 120 | 3 | 2.2 | 0.3 |

[1] n = 80 bro... stunning method.
[2] the concentration of argon (904 ml/l) was calculated indirectly by measuring the oxygen level.

TABLE 2

Comparison of Stunning and Plucking Methods on Meat quality of broilers

| | Stunning method: | | | | | |
|---|---|---|---|---|---|---|
| | Carbon dioxide | | | Argon | | |
| | Plucking method: | | | | | |
| Parameters@ | MP (n = 20) | HP (n = 20) | Mean (n = 40) | MP (n = 20)[x] | HP (n = 18)[y] | Mean (n = 38) |
| Meat quality: | | | | | | |
| pH 20 min post mortem | 6.34 | 6.40 | 6.39 | 5.93 | 5.88 | 5.91 |
| pH 24 h post mortem | 5.75 | 5.79 | 5.77 | 5.79 | 5.83 | 5.81 |
| pH drop (20 m − pH 24 h) | 0.60 | 0.64 | 0.62 | 0.13 | 0.07 | 0.10 |
| Cooking loss (g/kg) | 279.60 | 245.40 | 262.50 | 272.40 | 247.80 | 260.70 |
| Testure (kg force) | 2.21 | 1.84 | 2.02 | 2.15 | 1.43 | 1.80 |
| Colour (CIE LAB space): | | | | | | |
| L* | 54.48 | 55.06 | 54.77 | 52.16 | 53.42 | 52.74 |
| a* | 1.43 | 1.55 | 1.49 | 2.00 | 2.13 | 2.06 |
| b* | −0.42 | −0.09 | −0.25 | −0.63 | −0.22 | −0.44 |
| Chroma | 1.98 | 2.09 | 2.04 | 2.55 | 2.47 | 2.51 |
| Hue angle | 0.02 | 0.04 | 0.01 | −0.22 | −0.01 | −0.12 |
| Brightness | 54.52 | 55.10 | 54.82 | 52.23 | 53.49 | 52.81 |

| | Stunning method: | | | Significance of difference between means | | |
|---|---|---|---|---|---|---|
| | Electrical | | | | | |
| | Plucking method: | | | | | |
| Parameters@ | MP (n = 20) | HP (n = 20) | Mean (n = 40) | LSD (at 5%) | Stunning methods | Plucking methods |
| Meat quality: | | | | | | |
| pH 20 min post mortem | 6.55 | 6.58 | 6.56 | 0.06 | *** | NS |
| pH 24 h post mortem | 5.84 | 5.81 | 5.83 | 0.03 | * | NS |

TABLE 2-continued
Comparison of Stunning and Plucking Methods on Meat quality of broilers

| | | | | | | |
|---|---|---|---|---|---|---|
| pH drop (20 m − pH 24 h) | 0.71 | 0.75 | 0.73 | 0.06 | *** | NS |
| Cooking loss (g/kg) | 264.70 | 255.00 | 259.90 | 7.30 | NS | *** |
| Testure (kg force) | 2.23 | 2.15 | 2.19 | 0.17 | * | ** |
| Colour (CIE LAB space): | | | | | | |
| L* | 54.02 | 55.49 | 54.75 | 0.98 | * | NS |
| a* | 1.80 | 1.78 | 1.79 | 0.20 | ** | NS |
| b* | −0.23 | −0.39 | −0.31 | 0.34 | NS | NS |
| Chroma | 2.23 | 2.09 | 2.16 | 0.22 | * | NS |
| Hue angle | −0.10 | −0.05 | −0.07 | 0.17 | NS | NS |
| Brightness | 54.08 | 55.54 | 54.81 | 0.95 | * | NS |

NS = not statistically significant;
* = $P < 0.05$;
** = $P < 0.01$;
*** = $P < 0.001$.
MP = mechanically plucked;
HP = hand plucked.
@cooking loss was estimated on the whole eviscerated carcass whereas other parameters were measured on muscle p. major.
x indicates n = 19 in the case of texture;
y = indicates n = 17 in the case of colour parameters

TABLE 3
Effect of Stunning and Plucking methods on Carcass Quality of Broilers

| | Stunning Methods | | | | | |
|---|---|---|---|---|---|---|
| | carbon dioxide | | argon | | electrical | |
| | MP | HP | MP | HP | MP | HP |
| Carcass quality defects | n = 20 | n = 20 | n = 20 | n = 18 | n = 20 | n = 20 |
| | Number of carcasses | | | | | |
| Appearance defects: | | | | | | |
| Red pygostyle | 5 | 0 | 3 | 0 | 0 | 0 |
| Red wing tips | 2 | 0 | 3 | 1 | 3 | 1 |
| Wing vein haemorrhage | 2 | 0 | 8 | 0 | 7 | 0 |
| Wing vein engorgement | 2 | 0 | 0 | 0 | 1 | 2 |
| Shoulder haemorrhage | 0 | 3 | 0 | 1 | 1 | 0 |
| Red feather tract (breast) | 3 | 0 | 1 | 1 | 3 | 1 |
| Total | 14 | 3 | 15 | 3 | 15 | 4 |
| Broken bones: | | | | | | |
| Corocoid | 0 | 0 | 0 | 0 | 4 | 1 |
| Scapula | 0 | 0 | 0 | 0 | 1 | 0 |
| Furculum | 8 | 2 | 3 | 0 | 6 | 3 |
| Total | 8 | 2 | 3 | 0 | 11 | 4 |
| Muscle bruising: | | | | | | |
| Breast: | | | | | | |
| deep | 0 | 0 | 0 | 0 | 11 | 10 |
| superficial | 0 | 0 | 0 | 0 | 1 | 4 |
| Total | 0 | 0 | 0 | 0 | 12 | 14 |
| Leg: | | | | | | |
| deep | 1 | 0 | 0 | 0 | 4 | 3 |
| superficial | 2 | 0 | 0 | 1 | 5 | 6 |
| Total | 3 | 0 | 0 | 1 | 9 | 9 |

MP = mechanically plucked;
HP = hand plucked.

EXAMPLE 2

The merits of gaseous stunning procedures were evaluated further by examining the incidence of broken bones in the carcasses broilers slaughtered by using 2% oxygen or 45% or 55% carbon dioxide or electrical stunning in comparison with the Euthatal control (no stunning treatment). The gaseously stunned broilers were stunned in batches of ten per transport crate as described under example 3. Electrical stunning was performed by using a water bath stunner delivering 107mA for 4S. After slaughtering, the unplucked and uneviscerated carcasses were crated and frozen until dissected for the examination of broken bones.

The results indicated that the gaseous stunning methods resulted in a lower incidence of broken bones when compared to electrical stunning.

The results are presented in Table 4 which shows that the percentage of birds with broken bones in the gaseous stunning treatment were very much lower when compared to electrical stunning for the current used in this study. Although the control group injected with Euthatal had a similar incidence of broken bones as that of 2% oxygen treatment, the majority of Euthatal treated birds had broken pubis, which could have occurred due to crating and uncrating of the birds.

When the individual bones were grouped according to their anatomical location, it is apparent that the incidence of broken pectoral bones, (scapula, coracoid and furculum) was lower in the gaseous stunned birds (2, 5 and 1 respectively in 2% oxygen, 45% and 55% carbon dioxide). In contrast, this incidence was 47 in the electrically stunned birds. The incidence of broken wing bones (humerus, radius and ulna) occurred to a similar extent in electrical stunning and in the 2% oxygen treatment (8 and 10 respectively), but was slightly higher in the carbon dioxide treatment (13 and 16 respectively in 45% and 55% levels).

The incidence of broken leg bones (femur, tibiotarsus and fibula) keel, lateral process and pelvic bones (pelvis, illium, ischium and pubis) were low in the stunning treatments. The higher incidence of broken dorsal ribs in the 55% carbon dioxide treatment is thought to be an artefact due to the handling of stacked crates during storage, rather than the stunning procedure.

It is concluded that stunning of broilers in 2% oxygen or 45% carbon dioxide or 55% carbon dioxide resulted in lower incidence of broken bones (0.14, 0.26 and 0.27 per bird) when compared to electrical stunning (0.63 per bird).

volume of oxygen for a sufficient period of time for them to lose consciousness.

3. A method as claimed in claim 2, in which the atmosphere contains less than 1% by volume of oxygen.

4. A method as claimed in claim 2, in which the atmosphere comprises argon or nitrogen.

5. A method as claimed in claim 4, in which the atmosphere additionally includes carbon dioxide.

6. A method as claimed in claim 2, in which the poultry are subjected to the atmosphere in crates suitable for their transport.

7. A method as claimed in claim 2, in which the poultry are slaughtered by subjecting them to the atmosphere for a sufficiently long period for them to die.

TABLE 4

| Incidence of Broken Bones in Different Stunning Procedures | | | | | |
|---|---|---|---|---|---|
| | Slaughter methods | | | | |
| | 2% $O_2$ | 45% $CO_2$ | 55% $CO_2$ | Electrical | Euthatal |
| Number of birds killed | 92 | 72 | 100 | 100 | 50 |
| Percentage of birds with one or more broken bones | 11 | 17 | 23 | 39 | 14 |
| Broken bones per bird | 0.14 | 0.26 | 0.27 | 0.63 | 0.14 |
| Number of individual broken bones: | | | | | |
| Femur | 0 | 0 | 0 | 1 | 0 |
| Tibiotarsus | 0 | 1 | 0 | 1 | 0 |
| Fibula | 0 | 0 | 0 | 1 | 0 |
| Humerus | 4 | 2 | 6 | 3 | 1 |
| Radius | 4 | 6 | 6 | 2 | 0 |
| Ulna | 2 | 5 | 4 | 3 | 0 |
| Keel | 0 | 0 | 0 | 0 | 0 |
| Lateral process | 0 | 0 | 0 | 0 | 0 |
| Scapula | 0 | 2 | 0 | 32 | 1 |
| Coracoid | 0 | 0 | 1 | 3 | 0 |
| Furculum | 2 | 3 | 0 | 12 | 0 |
| Dorsal | 0 | 0 | 10 | 0 | 1 |
| Ventral ribs | 0 | 0 | 0 | 0 | 0 |
| Pelvis | 0 | 0 | 0 | 2 | 0 |
| Illium | 0 | 0 | 0 | 0 | 0 |
| Ischium | 0 | 0 | 0 | 1 | 0 |
| Pubis | 1 | 0 | 0 | 2 | 4 |

We claim:

1. A method of forming portions of poultry carcasses comprising the steps of slaughtering poultry and dividing the resulting carcasses into portions for deboning them, wherein immediately prior to slaughter the poultry are caused to undergo anoxic convulsions and wherein the carcasses are debonded or portioned within four hours of slaughter.

2. A method as claimed in claim 1, in which the poultry are caused to undergo anoxic convulsions by being subjected to an atmosphere containing less than 2% by 8. A method as claimed in claim 2, in which immediately after slaughter the poultry are bled.

9. A method as claimed in claim 2; in which 20 minutes after slaughter each bird has a pectoralis major muscle pH of less than 6.

10. A method as claimed in claim 1 in which the carcasses are chilled prior to deboning or portioning.

11. A method as claimed in claim 1, in which the carcasses are deboned or portioned within one to three hours of their slaughter.

* * * * *